(12) United States Patent
Mody et al.

(10) Patent No.: US 11,157,345 B2
(45) Date of Patent: Oct. 26, 2021

(54) METHODS AND APPARATUS TO PROVIDE AN EFFICIENT SAFETY MECHANISM FOR SIGNAL PROCESSING HARDWARE

(71) Applicant: Texas Instruments Incorporated, Dallas, TX (US)

(72) Inventors: Mihir Narendra Mody, Bangalore (IN); Niraj Nandan, Plano, TX (US); Hetul Sanghvi, Richardson, TX (US); Manoj Koul, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/844,170

(22) Filed: Dec. 15, 2017

(65) Prior Publication Data

US 2019/0188066 A1    Jun. 20, 2019

(51) Int. Cl.
| | | |
|---|---|---|
| G06F 11/07 | (2006.01) | |
| G06K 9/62 | (2006.01) | |
| G06T 5/00 | (2006.01) | |
| G06K 9/56 | (2006.01) | |
| G06K 9/03 | (2006.01) | |
| G06T 7/00 | (2017.01) | |
| H04L 12/24 | (2006.01) | |

(52) U.S. Cl.
CPC ........ G06F 11/079 (2013.01); G06F 11/0736 (2013.01); G06F 11/0751 (2013.01); G06F 11/0772 (2013.01); G06K 9/03 (2013.01); G06K 9/56 (2013.01); G06K 9/6202 (2013.01); G06T 5/00 (2013.01); G06T 7/0002 (2013.01); H04L 41/0677 (2013.01)

(58) Field of Classification Search
CPC ............... G06F 11/079; G06F 11/0736; G06F 11/0772; G06F 11/0751; G06T 5/00; G06T 7/0002; G06K 9/6202; H04L 41/0677
See application file for complete search history.

(56) References Cited

U.S. PATENT DOCUMENTS

| | | | | |
|---|---|---|---|---|
| 2003/0221093 | A1* | 11/2003 | Touchet | ................ G06F 9/4401 713/1 |
| 2004/0255145 | A1* | 12/2004 | Chow | ................. G06F 12/1466 726/16 |
| 2006/0062285 | A1* | 3/2006 | Hong | ..................... H04B 1/707 375/150 |
| 2007/0133893 | A1* | 6/2007 | Jerdev | .................. H04N 5/3675 382/254 |
| 2007/0188817 | A1* | 8/2007 | Noguchi | ............ H04N 1/32144 358/3.28 |
| 2016/0321094 | A1* | 11/2016 | Rabi | .................... G06F 9/45558 |

* cited by examiner

*Primary Examiner* — John W Lee
(74) *Attorney, Agent, or Firm* — Charles F. Koch; Charles A. Brill; Frank D. Cimino

(57) ABSTRACT

Methods, apparatus, and articles of manufacture providing an efficient safety mechanism for signal processing hardware are disclosed. An example apparatus includes an input interface to receive an input signal; a hardware accelerator to process the input signal, the hardware accelerator including: unprotected memory to store non-critical data corresponding to the input signal; and protected memory to store critical data corresponding to the input signal; and an output interface to transmit the processed input signal.

29 Claims, 10 Drawing Sheets

METHODS AND APPARATUS TO PROVIDE AN EFFICIENT SAFETY MECHANISM FOR SIGNAL PROCESSING HARDWARE

FIELD OF THE DISCLOSURE

This disclosure relates generally to signal processing, and, more particularly, to methods and apparatus to provide an efficient safety mechanism for signal processing hardware.

BACKGROUND

Safety protocols are used to ensure safety in electrical and/or electronical systems. For example, International Organization for Standardization (ISO) 26262 is an international standard for functional safety of electrical and/or electronic systems in automobiles. Such safety protocols analyze risk (e.g., the combination of the frequency of occurrence of harm and the severity of that harm) associated with electronic failures. Failures corresponding to electronics may be random or systematic. Random failures usually correspond to hardware related permanent or transient failure due to a system component loss of functionality and systematic failures usually correspond to design faults, incorrect specifications, and/or not fit for purpose errors in software. Such safety protocols may analyze the electrical risks corresponding to signal processing sub-systems (e.g., an imaging and/or visioning sub-systems) that may process a signal.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
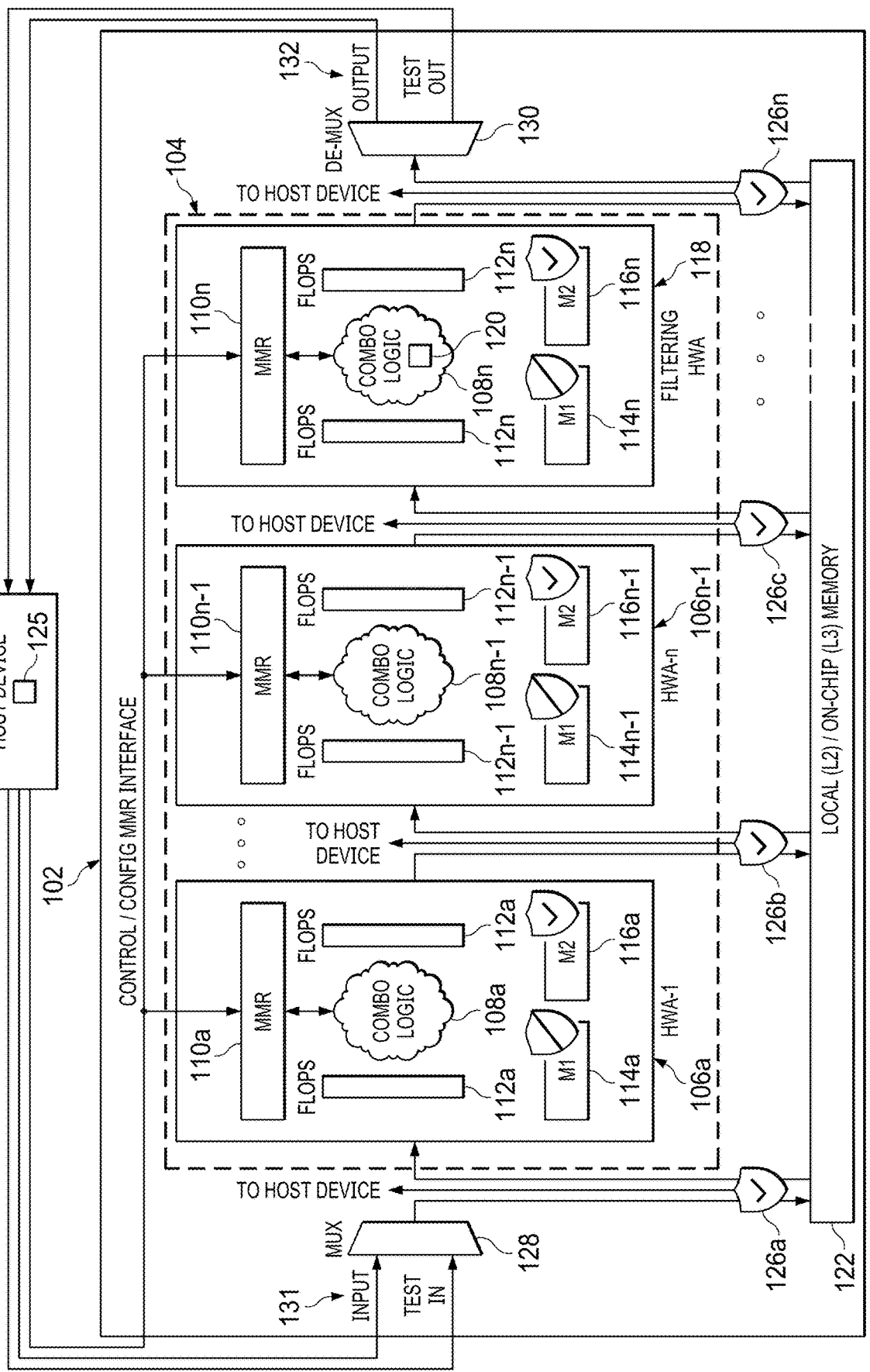
FIG. 1 is an illustration of an example signal processing sub-system providing an efficient safety mechanism.

Electrical and/or computing devices have increased significantly as technology advances. Such devices include hardware, software, and/or firmware to perform particular function(s). If an error occurs in the hardware, software, and/or firmware, such devices may not be able to perform the particular function(s) or may have poor performance. Such inability to perform and/or poor performance may affect the results of a system. For example, an autopilot computing device may gather raw image data from a sensor and transmit the raw image data to an image processing sub-system to process the image data and/or render an image. Once the autopilot computing device receives the rendered image, the autopilot computing device may make navigation decisions based on further analysis of the rendered image. To ensure proper navigation decision-making, safety protocols (e.g., safety hooks) may be in place to ensure that electrical and/or electronical systems are functional (e.g., to reduce risk) and that proper data is available for the decision-making process. In some examples, safety protocols may be used in conjunction with signal processing sub-systems.

Signal processing sub-systems may be utilized in conjunction with a processor to perform signal processing protocols due to the efficiency of such sub-systems. Signal processing sub-systems include hardware (e.g., memory, electrical circuits and/or components, etc.) to process an input signal. For example, signal processing sub-systems include hardware accelerators to perform specific signal processing tasks corresponding to a signal processing protocol (e.g., a signal processing protocol is broken into tasks executed by the multiple hardware accelerators). The hardware accelerators include local memory (e.g., L1 memory) to store the input data and the signal processing sub-system includes local/on chip memory (e.g., L2/L3 memory) to store and transfer the input data between the multiple hardware accelerators. Such signal processing sub-systems may be subject to hardware errors, such as when a memory register inadvertently switches its stored logic value. For example, a soft error in memory may occur when nuclear particles collide with transistors inside memory, causing bits to inadvertently flip. Some hardware errors may correspond to critical errors while other hardware errors may correspond to non-critical errors. For example, in an imaging processing sub-system, a critical error may corrupt a large area of an image, while a non-critical error may corrupt single isolated pixel values.

Conventional safety protocols to ensure error protection and/or identification for signal processing sub-systems include providing memory protection to the local memory of the hardware accelerators. Such memory protection includes implementation of additional storage for check bits for each memory address, resulting in increased cost and silicon area required for such additional storage. Examples disclosed herein reduce the cost and silicon area corresponding to such conventional safety protocols by providing protected memory and unprotected memory for the hardware accelerators and allocating some data to be stored in the protected memory and other data to be stored in the unprotected memory. For example, critical data (e.g., data that, if corrupted, corresponds to a critical error) may be stored in protected memory and non-critical data (e.g., data that, if corrupted, corresponds to a non-critical error) may be stored in unprotected memory. In this manner, if a hardware error occurs, the error will have a minor effect the output while significantly reducing the cost and area corresponding to full memory protection.

To further reduce the effect of an error on the output of a signal process sub-system, examples disclosed herein further include filtering the output data to reduce and/or eliminate corrupted data corresponding to the error. For example, an image processing sub-system may include one or more pixel values, stored in the unprotected memory, that have been corrupted during the imaging processing process. Examples disclosed herein improve the input image by filtering the pixel values to adjust the corrupted pixel values based on neighboring pixel values. Accordingly, examples disclosed herein increase the quality of the output data based on the final filtering step.

Examples disclosed herein further include an interface protection protocol to identify errors caused by the hardware accelerators of a signal processing sub-system. Such interface protection protocols include a host device adding redundant bits to the control data of an input signal to be processed. In this manner, the signal processing sub-system can determine the redundant bits from the control signal and transmit the determined redundant bits back to the host device. In response, the host device can determine if a hardware error occurred when the generated redundant bits do not match the received determined redundant bits.

FIG. 1 illustrates an example signal processing sub-system 102 providing an efficient safety mechanism. The example of FIG. 1 includes an example signal processing chain 104, example hardware accelerators 106a-(n−1), 118, example combinatory logic circuits (e.g., combo logic) 108a-n, example memory-mapped registers (MMRs) 110a-n, example flip flops 112a-n, example unprotected memory 114a-n, example protected memory 116a-n, an example filtering hardware accelerator 118, an example outlier filter 120, example local/on-chip memory 122, an example host device 124, an example signal processing sub-system interface 125, example interface protectors 126a-n, an example multiplexer (MUX) 128, and an example de-multiplexer (DE-MUX) 130.

The example signal processing sub-system 102 of FIG. 1 is a circuit that processes a signal from the example host device 124 via the example input interface 131. The example signal processing sub-system 102 include circuitry to perform a specific function. For example, the signal processing sub-system 102 may be an imaging processing sub-system to receive raw pixel data and process the data to generate an image. The example signal processing sub-system 102 performs a specified function using the example signal processing pipeline 104.

The example signal processing pipeline 104 of FIG. 1 includes the example HWAs 106a-(n−1), 118 to perform a signal processing protocol. When the example signal processing sub-system 102 is enabled and receives an input signal, the input signal is processed, in series, by the example HWAs 106a-(n−1), 118. The HWAs 106a-(n−1), 118 correspond to a particular task, such that when the input signal is received from the example host device 124 via the input interface 131 (e.g., a bus that inputs data from the host device 124 to the signal processing sub-system 102), the input signal is processed by the HWA 106a-(n−1), 118. Once the signal processing pipeline 104 processes the input signal, the processed signal is transmitted back to the example host device 124 via the example output interface 132.

The example HWAs 106a-(n−1), 118 of FIG. 1 each include the example combo logic 108a-n, the example MMR 110a-n, the example flip flops 112a-n, the example unprotected memory 114a-n and the example protected memory 116a-n. The example combo logic 108a-n includes hardware to perform a particular task based on the instructions from the example host device 124. The example MMRs 110a-n are configuration registers that define pseudo-static configuration of the example flip flops 112a-n corresponding to how the combo logic 108a-n operates (e.g., defining the particular task performed by the combo logic 108a-n).

When an input signal is received by a HWA (e.g., the first example HWA 106a), the data of the input signal is stored in the example memories 114a, 116a of FIG. 1. Once stored, the example combo logic 108a performs the predefined function (e.g., based on the configuration of the example MMR 110a) based on the stored data. The input signal may include various data. For example, if the input signal corresponds to image data, the input data may include pixel data (e.g., a value corresponding to each pixel), motion vectors, stereo disparity, look up table information, filter coefficients, statistics, protocol information, etc. As described above, memory protection (e.g., Parity protection, error correcting code (ECC) protection, etc.) requires additional resources and board space, adding cost and size to an IC. For example, including ECC protocols require extra memory to store computed values during a write data operation and comparing to what is output when the data is read. Accordingly, to conserve board space and reduce cost, critical data is stored in the example protected memory 116a-n, which includes memory protection against memory failures (e.g., added memory registers to facilitate parity protocols, ECC protocols, etc.), while other data is stored in the unprotected memory 114a-n, which does not include memory protection against memory failures. Critical data corresponds to data whose failure (e.g., one or more bit failure) results in corruption of a large portion of the output (e.g., more than a threshold amount of data corruption). For example, in an imaging processing system, a failure corresponding to critical data may result in a large area of the image being unviewable (e.g., entirely black, white, or otherwise distorted). Such failures result in post processing failures (e.g., object detection failures). In such an example, pixel data corresponding to a pixel corruption may result in a single pixel being unviewable, which may have limited or no effect on post processing failures. Accordingly, the example protected memory 116a-n stores critical data and the example unprotected memory 114a-n stores non-critical data (e.g., data whose failure corresponds to less than a threshold amount of corruption). Lookup tables, protocol information, filter coefficients, and/or statistical memory within HWA may be predefined as critical data and data buffers (e.g., pixel data, motion vectors, and/or stereo disparity) may be predefined as non-critical data. In some examples, a user and/or manufacturer may determine which data should be stored in the unprotected 114a-n and/or the protected memory 116a-n.

The example filtering HWA 118 of FIG. 1 is a HWA structured to filter the processed input signal prior to being output to the example host device 124. Because non-critical data is stored in the example unprotected memory 114a-n of FIG. 1, individual data values may be corrupted. For example, if the example signal processing sub-system 102 is an image processing sub-system, individual pixel value may be corrupted. Accordingly, the example filtering HWA 118 may be implemented to filter the processed image, thereby increasing the quality of the output image by filtering out corrupted pixel values (e.g., adjusting the corrupted pixel value to a preset value corresponding to a better image quality). The example filtering HWA 118 includes the example outlier filter 120 to adjust outlier values, thereby increasing the overall data quality. For example, the outlier filter 120 may compare a pixel value to neighboring pixels (e.g., pixels within a threshold distance to a selected pixel). In some examples, the outlier filter 120 may determine outlier pixels based on the comparison and adjust the value of the pixel based on the neighboring pixel values. In this manner, corrupted pixel values are identified and adjusted to generate a higher quality image. The example filtering HWA 118 is the last HWA in the example signal processing pipeline 104 to filter out the output data prior to returning to the example host device 124. The example outlier filter 120 is further described below in conjunction with FIG. 4.

The example local/on-chip memory 122 of FIG. 1 is a common pool of memory that receives data and transmits the data in series to the example HWAs 106a-(n−1), 118. For example, the example local/on-chip memory 122 receives and stores the input data from the example host device 124. The example local/on-chip memory 122 transmits the stored input data to the first example HWA 106a and receives and stores the output of the first example HWA 106a. The example local/on-chip memory 122 continues to store and transmit the stored data throughout the example signal processing pipeline 104 until the example filtering HWA 118 transmits the output (e.g., the processed and filtered signal). Once the output is received, the example local/on-chip memory 122 transmits the output data to the example host device 124 using the example output interface 132 (e.g., a bus to output data from the signal processing sub-system 102 to the host device 124). The example local/on-chip memory 122 may be L2 cache (e.g., implemented by SRAM) and/or L3 cache.

The example host device 124 of FIG. 1 is a processing unit that transmits input data to the example signal processing sub-system 102 and receives the output data corresponding to the input data after being processed. For example, the host device 124 may be implemented as part of an auto-driving and/or semi auto-driving system on a vehicle (e.g., car, plane, train, board, etc.). In such an example, the host device 124 may receive image data from a sensor on the vehicle and transmit the data to the example signal processing sub-system 102 to be processed. Once processed, the example host device 124 may perform analytics and/or operate based on the processed data. For example, the host device 124 may utilize a processed image to make determinations regarding how to control the vehicle. The example host device 124 of FIG. 1 includes the example signal processing sub-system interface 125.

The example signal processing sub-system interface 125 of FIG. 1 interfaces with the example signal processing sub-system 102 to initiate signal processing of data. For example, the signal processing sub-system interface 125 may transmit control/configuration instructions to the MMRs 110a-n to configure the example HWAs 106a-(n−1), 118 to perform signal processing. Additionally, the example signal processing sub-system interface 125 may initiate a signal processing scheme by transmitting the input data to the example signal processing sub-system 102. The example signal processing sub-system interface 125 receives the processed signal via the output interface 132. In some examples, the signal processing sub-system interface 125 may include (e.g., generate and add) redundant bits in the control signal of the input data. In such examples, the interface protectors 126a-n may calculate the redundant bits from the control signal and transmit the redundant bits back to the example signal processing sub-system interface 125.

Each interface protector 126a-n corresponds a hardware component of the example signal processing sub-system 102 that is outputting the signal. For example, the first example interface protector 126a corresponds to an error of the example local/on-chip memory 122, the second example interface protector 126b corresponds to an error of the first example HWA 106a, etc. Additionally or alternatively, any number of the example interface protectors 126a-n may be used at any part of the example signal processing sub-system 102.

The example signal processing sub-system interface 125 of FIG. 1 compares the generated redundant bits to the receive redundant bits to determine if a HWA is faulty. For example, if the redundant bits from the second interface protector 126b corresponding to a first HWA 106a does not match the generated redundant bits, the example signal processing sub-system interface 125 determines that the first HWA 106a is faulty. An example of the example interface protectors 126a-n is further described below in conjunction with FIG. 6. In some examples, the signal processing sub-system interface 125 performs a hardware test (e.g., a golden test) of the example signal processing sub-system 102 by controlling the example MUX 128 and the example De-MUX 130 to input a known test input with a known test output. In this manner, the example signal processing sub-system interface 125 can compare the known test output to a received output to determine the status of the example signal processing sub-system 102 and/or make adjustments to the example signal process sub-system 102. The example signal processing sub-system interface 125 is further described below in conjunction with FIG. 5.

Although the example signal processing sub-system 102 of FIG. 1 includes three safety hook protections (e.g., Parity/ECC protection of the example protected memory 116a-n, interface protection using the example interface protectors 126a-n, and golden test input and output using the example test input/output interface), other safety hook protections may additionally be utilized. For example, the example flip flops 112a-n may be implemented with dice flops for critical registers, firewall and magic pattern may be implemented on the example MMR interface for un-wanted writes, watch-dog timer protection may be implemented in the example combo logic 108a-n, etc.

Figure 2:
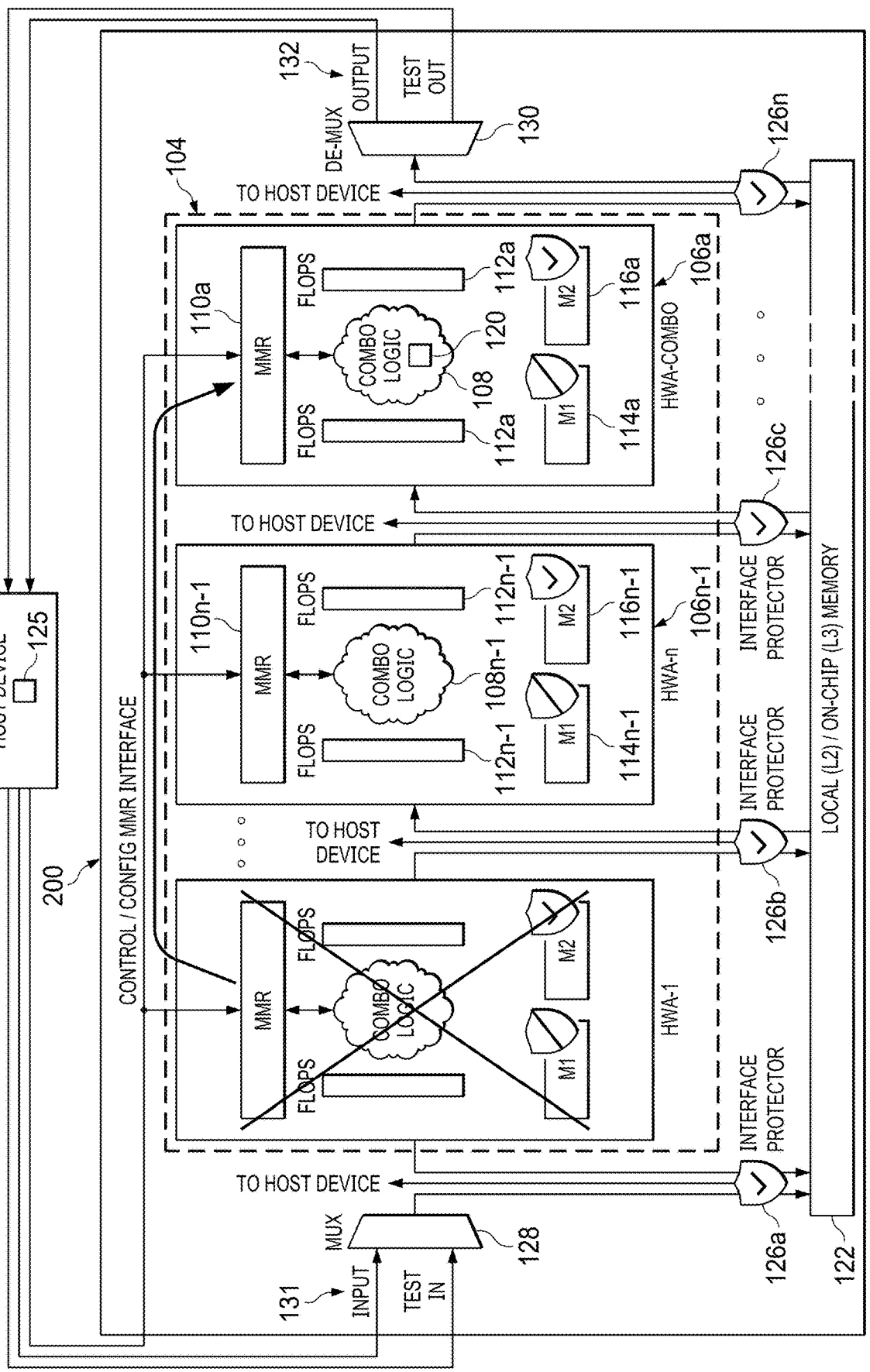
FIG. 2 is an illustration of an alternative example signal processing hardware providing an efficient safety mechanism.

FIG. 2 illustrates an alternative example signal processing sub-system 200 an efficient safety mechanism. The example of FIG. 2 includes the example signal processing chain 104, the example hardware accelerators 106a-(n−1), the example combo logic 108a-n−1, the example memory-mapped registers (MMRs) 110a-n−1, the example flip flops 112a-n−1, the example unprotected memory 114a-n−1, the example protected memory 116a-n−1, the example outlier filter 120, the example local/on-chip memory 122, the example host device 124, the example signal processing sub-system interface 125, the example interface protectors 126a-n−1, the example multiplexer (MUX) 128, and the example de-multiplexer (DE-MUX) 130.

Because many types of signal processing sub-systems already include an HWA that performs a filtering operation, the alternative example signal processing sub-system 200 of FIG. 2 rearranges the example HWAs 106a-(n−1) such that a HWA that already corresponds to filtering is moved to the end of the example signal processing pipeline 104, thereby allowing a final filtering protocol using an HWA already dedicated to filtering (e.g., combining an outlier filter operation with pre-existing filter operation), without requiring an extra HWA (e.g., the example filtering HWA 118 of FIG. 1). In this manner, the alternative example signal processing sub-system 200 conserves more space and requires less cost by utilizing the combo HWA 106a for a combination of its signal processing purpose and for post process filtering. For example, in a visual/imaging sub-system (VISS), a defective pixel correction HWA may be moved to the end of the example signal processing pipeline 104. In a Vision Processing Acceleration (VPAC) sub-system (e.g., used for image processing automotive chips), a noise filter HWA may be moved to the end of the example signal processing pipeline 104. In a depth and motion processing accelerator (DMPAC) sub-system (e.g., used for image processing automotive chips), a post-processing median filter HWA may be moved to the end of the optical flow and stereo disparity in the example signal processing pipeline 104. Although the example of FIG. 2 illustrates the first example HWA 106a as being a filtering HWA, any of the example HWAs 106a-(n-1) may be a filtering HWA.

Figure 3:
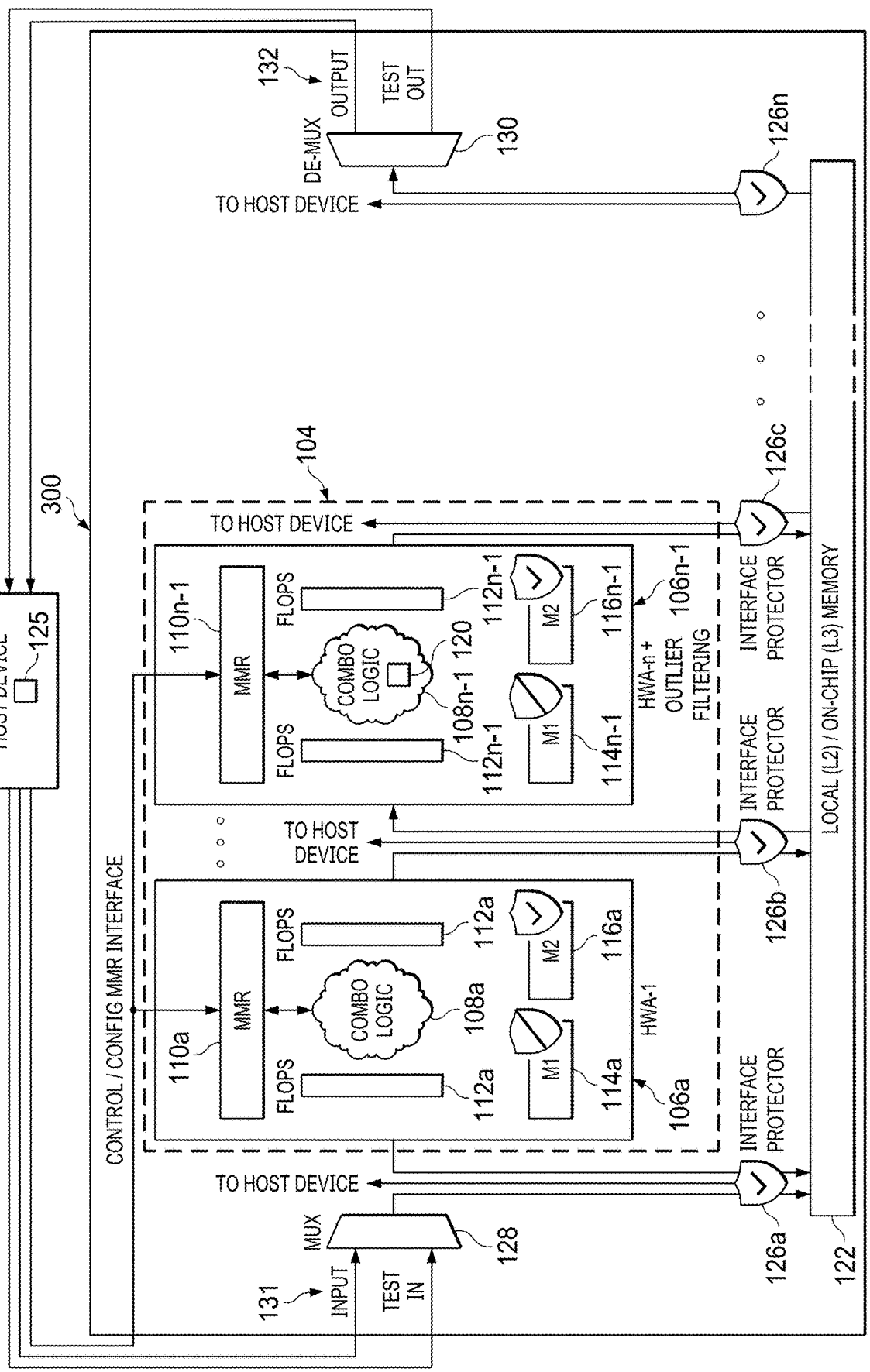
FIG. 3 is an illustration of an alternative example signal processing hardware providing an efficient safety mechanism.

FIG. 3 illustrates an alternative example signal processing sub-system 300 an efficient safety mechanism. The example of FIG. 2 includes the example signal processing chain 104, the example hardware accelerators 106a-(n-1), the example combo logic 108a-n-1, the example memory-mapped registers (MMRs) 110a-n-1, the example flip flops 112a-n-1, the example unprotected memory 114a-n-1, the example protected memory 116a-n-1, the example outlier filter 120, the example local/on-chip memory 122, the example host device 124, the example signal processing sub-system interface 125, the example interface protectors 126a-n-1, the example multiplexer (MUX) 128, and the example de-multiplexer (DE-MUX) 130.

In the illustrated example of FIG. 3, the nth example HWA 106n (e.g., the last HWA in the example signal processing pipeline 104) has been structured (e.g., using the example MMR 110n) to (A) perform the last step of the signal processing (e.g., using the example combo logic 108n-1) and (B) filter the output signal (e.g., using the example outlier filter 120). In this manner, the nth example HWA 106n has a dual purpose to conserve space and reduce the cost of including the example filtering HWA 118 of FIG. 1 in the example signal processing pipeline 104.

Figure 4:
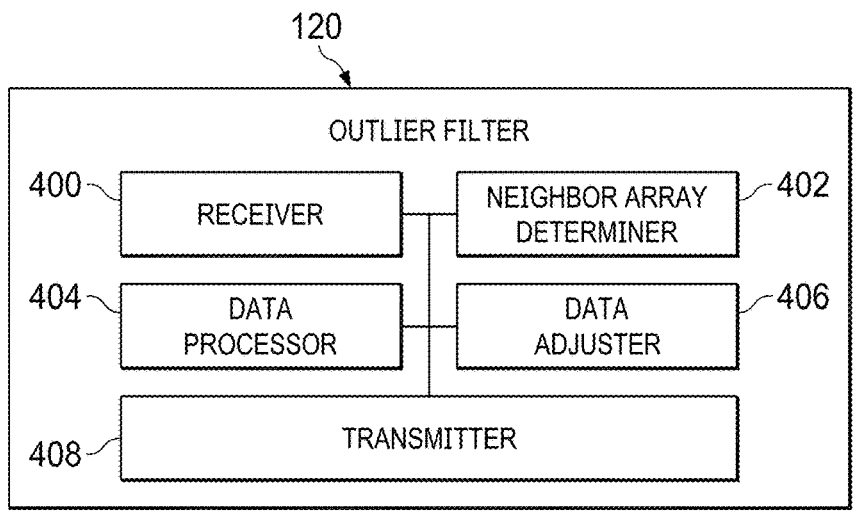
FIG. 4 is a block diagram of an example outlier filter of FIGS. 1-3.

FIG. 4 is a block diagram of the example outlier filter 120 of FIGS. 1-3. The example outlier filter 120 includes an example receiver 400, an example neighbor array determiner 402, an example data processor 404, an example data adjuster 406, and an example transmitter 408. The example outlier filter 120 is described in conjunction with the example signal processing sub-system 102, 200, 300 of FIGS. 1-3. Alternatively, the example outlier filter 120 of FIGS. 1-3 may be utilized with any type of signal processing sub-system.

The example receiver 400 of FIG. 4 receives the data from the example unprotected memory 114a-n. For example, in an image processing sub-system, the example receiver 400 may receive pixel data from the example unprotected memory 114a-n. The pixel data includes pixel values for pixels that correspond to an image, for example. Each pixel value corresponds to a color and/or brightness.

The example neighbor array determiner 402 of FIG. 4 generates neighbor arrays for one or more predefined pixels for pixel comparison. For example, the neighbor array determiner 402 may generate neighboring arrays of predefined pixels of an image for such pixel value comparisons. The neighbor array determiner 402 may generate a N×M array corresponding to a predefined pixel. For example, the neighbor array determiner 402 may generate a 3×3 array of pixels for a predefined pixel, where the predefined pixel is the center of the 3×3 array. In such examples, different dimension arrays may be generated for different pixels and/or the predefined pixel may be in a different location. For example, because corner cannot be the center of a neighbor array, a 2×2 neighbor array may be generated for a predefined corner pixel, where the corner pixel is the corner of the neighbor array. In some examples, the neighbor array determiner 402 may generate N×M arrays for a limited number of predefined pixels of an image (e.g., such that the image is broken up into multiple non-overlapping neighbor arrays that includes every pixel in multiple neighbor arrays of the image). In some examples, the neighbor array determiner 402 may generate a N×M array for all pixels of an image, where N and M may vary from pixel to pixel.

The example data processor 404 of FIG. 4 processes one or more predefined pixels based on a comparison of the predefined pixels to the corresponding neighboring array to determine if a predefined pixel is an outlier. In some examples, the data processor 404 determines if the average difference (e.g., Hamming distance) between the predefined pixel value and the neighboring pixel values is more than a threshold. For example, if the predefined pixel has a value of 1, and the neighbor array pixels have values of 10, 9, 11, 8, 10, 6, 10, and 11, the average distance with respect to the predefined pixel is 8.4

$$\left(\text{e.g.,}\ \frac{(10-1)+(9-1)+(11-1)+(8-1)+(10-1)+(6-1)+(10-1)+(11-1)}{8}\right).$$

In such an example, if the threshold corresponds to 6, then the data processor 404 determines that the predefined pixel is faulty (e.g., an outlier). In some examples, the data processor 404 finds the minimum and maximum pixel value of each neighbor array pixel and if the predefined pixel is more than a maximum threshold or less than a minimum threshold, the example data processor 404 determines that the predefined pixel is faulty (e.g., an outlier). Using the above example, because the predefined pixel has a value of 1 and the minimum value of a pixel in the neighbor array is 6, the example data processor 404 determines that the predefined pixel is an outlier.

The example data adjuster 406 of FIG. 4 adjusts the predefined pixel values to filter the image. In some examples, the data adjuster 406 adjusts predefined pixel values that are outliers. For example, if the example data processor 404 determines that the predefined pixel value is an outlier because the average distance to the predefined pixel value with respect to the neighbor pixel values is greater than a threshold, the example data adjuster 406 adjusts the predefined pixel value to the average pixel value of the neighborhood array (e.g., which may be calculated by the data processor 404 based on instructions from the data adjuster 406). In another example, if the example data processor 404 determines that the predefined pixel value is an outlier because the predefined pixel value is lower than the minimum value of the neighbor array or higher than the maximum value of the neighbor array, the example data adjuster 406 adjusts the predefined pixel value to the minimum or maximum value of the neighbor array. Once the example data adjuster 406 adjusts the values of the predefined outlier pixels, the filter protocol is complete. In some examples, the data adjuster 406 adjusts the value of the predefined pixel value regardless whether the value is an outlier or not. For example, the data adjuster 406 may instruct the data processor 404 to determine the median of all pixel values of the neighbor array and adjust the value of the predefined pixel to be the median value. In such examples, once the values of the predefined pixels have been adjusted, the filtering protocol is complete. Once complete, the example transmitter 408 transmits the filtered data to the example local/on-chip memory 122 of FIG. 2.

Figure 5:
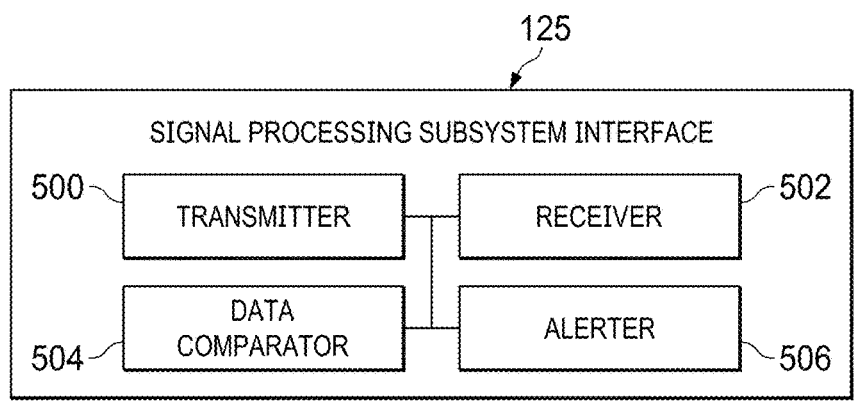
FIG. 5 is a block diagram of an example signal processing sub-system interface of FIGS. 1-3.

FIG. 5 is a block diagram of the example signal processing sub-system interface 125 of FIGS. 1-3. The example signal processing sub-system interface 125 includes an example transmitter 500, an example receiver 502, an example data comparator 504, and an example alerter 506.

The example transmitter 500 of FIG. 5 transmits input signals/test signals to the example signal processing sub-system 102, 200, 300 of FIGS. 1-3 via the input interface/test interface. Additionally, the example transmitter 500 may transmit a select signal to the example MUX 128 and/or the example De-MUX 130 when transmitting an input signal or a test signal. In some examples, the transmitter 500 adds redundant bits to the input signal that is transmitted to the example signal processing sub-systems 102, 200, 300. The example transmitter 500 may add the redundant bits using a parity check protocol, a cyclic redundancy check protocol, a checksum protocol, etc. Additionally, the example transmitter 500 transmits control/configure signals to configure the example MMRs 110a-n of the example HWAs 106a-(n-1), 118 of FIGS. 1-3. The example transmitter 500 may transmit the received data (e.g., input data that has been processed and filtered by the example signal processing sub-system 102, 200, 300) and/or alerts to other components of the example host device 124 for further processing.

The example receiver 502 of FIG. 5 receives the output (e.g., the signal processed input) and/or a test output signal via the output interface 132/test output interface. Additionally, the example receiver 502 receives redundant bit calculations from the example interface protectors 126a-n.

The example data comparator 504 of FIG. 5 compares known data to received data to identify hardware failures. For example, when the transmitter 500 transmits input data with known redundant bits added and the receiver 502 receives the redundant bits from the example interface protectors 126a-n, the example data comparator 504 compares the added (e.g., known) redundant bits to the received redundant bits. If the received redundant bits match the added redundant bits, the example data comparator 504 determines that no hardware error has occurred. If one or more of the received redundant bits do not match the added redundant bits, the example data comparator 504 determines that a hardware error has occurred. Additionally, the example data comparator 504 determines where the hardware error has occurred. For example, if the received redundant bits begin to mismatch the added redundant bits starting at a first interface protector location, the example data comparator 504 may determine that the error occurred at the HWA preceding the interface protector that corresponds to a mismatch. In some examples, to conserve resources, the example data comparator 504 may only compare the received redundant bits from the last interface protector 126n (e.g., the interface protector that determines the redundancy bits after the input signal has been fully processed and filtered). In this manner, if the comparison results in a match, the example data comparators 504 assumes that no error has occurred. If the comparison results in a mismatch, the example data comparator 504 may then compare the other received redundancy bits from the other interface protectors 126a-n, to identify where the fault occurred. In some examples, the data comparator 504 compares known test data to a received test output of the example signal processing sub-system 102, 200, 300 to determine if the example signal processing sub-system 102, 200, 300 is faulty or not (e.g., based on whether the test output data matches the known output data).

The example alerter 506 of FIG. 5 generates an alert to the other components of the example host device 124 when the example data comparator 504 determines that an error has occurred. The alert may be a signal/trigger that causes other components of the example host device 124 to perform a function. In some examples, the alert may be transmitted to a user via a user interface.

Figure 6:
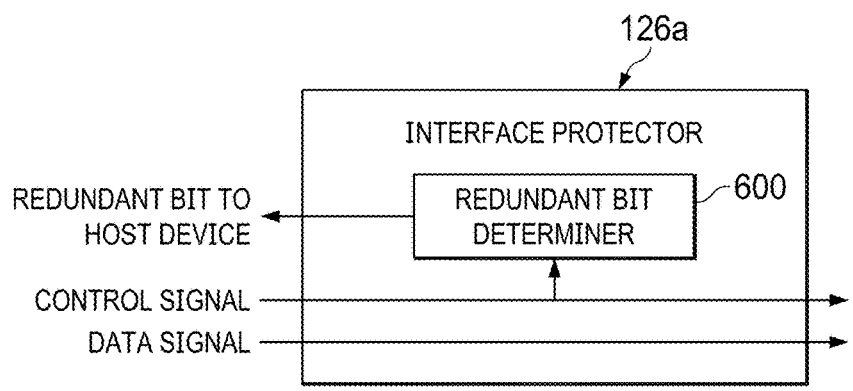
FIG. 6 is a block diagram of an example interface protector of FIGS. 1-3.

FIG. 6 is a block diagram of the example interface protector 126a of FIGS. 1-3. The example interface protector 126a includes an example redundant bit determiner 600. Although the example of FIG. 6 is described in conjunction with the example interface protector 126a of FIG. 1, the example of FIG. 6 may be described in conjunction with any of the example interface protectors 126a-n.

The example redundant bit determiner 600 of FIG. 6 receives the control signal to determine the redundant bits from the example control signal. As explained above, an input signal may include a control signal and a data signal. The control signal may include address information, protocol information, etc., while the data signal includes the pixel values. The example redundant bit determiner 600 determines redundant bits using the control signal, because errors in the control signal correspond to more critical errors in the output signal. However, in some examples, the example redundant bit determiner 600 may determine redundancy bits from the data signal and/or from a combination of the control signal and the data signal. The example redundant bit determiner 600 may determine the redundant bits using a parity check protocol, a cyclic redundancy check protocol, a checksum protocol, etc. Once the example redundant bit determiner 600 determines the redundant bits from the control signal, the redundant bit determiner 600 transmits the determined redundant bits to the example host device 124 for further processing (e.g., to compare the determined redundant bits with the known redundant bits to identify a hardware error). In some examples, to conserve resources, the redundant bit determiner 600 generates a signature packet (e.g., a parity packet) based on the redundant bits and transmits the signature packet to the example host device 124 for processing.

While an example manner of implementing the example outlier filter 120 of FIGS. 1-3 is illustrated in FIG. 4, an example manner of implementing the example signal processing sub-system interface 125 of FIGS. 1-3 is illustrated in FIG. 5, and an example manner of implementing the example interface protector 126a-n of FIGS. 1-3 is illustrated in FIG. 6, one or more of the elements, processes and/or devices illustrated in FIGS. 4-6 may be combined, divided, re-arranged, omitted, eliminated and/or implemented in any other way. Further, the example receiver 400, the example neighbor array determiner 402, the example data processor 404, the example data adjuster 406, the example transmitter 408, the example transmitter 500, the example receiver 502, the example comparator 504, the example alerter 506, the example redundant bit determiner 600, and/or, more generally, the example outlier filter 120, signal processing sub-system interface 125, and/or interface protector 126a-n of FIGS. 4-6 may be implemented by hardware, software, firmware and/or any combination of hardware, software and/or firmware. Thus, for example, any of the example receiver 400, the example neighbor array determiner 402, the example data processor 404, the example data adjuster 406, the example transmitter 408, the example transmitter 500, the example receiver 502, the example comparator 504, the example alerter 506, the example redundant bit determiner 600, and/or, more generally, the example outlier filter 120, signal processing subsystem interface 125, and/or interface protector 126a-n of FIGS. 4-6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver 400, the example neighbor array determiner 402, the example data processor 404, the example data adjuster 406, the example transmitter 408, the example transmitter 500, the example receiver 502, the example comparator 504, the example alerter 506, the example redundant bit determiner 600, and/or, more generally, the example outlier filter 120, signal processing sub-system interface 125, and/or interface protector 126a-n of FIGS. 4-6 is/are hereby expressly defined to include a non-transitory computer readable storage device or storage disk such as a memory, a digital versatile disk (DVD), a compact disk (CD), a Blu-ray disk, etc. including the software and/or firmware. Further still, the example the example outlier filter 120, signal processing sub-system interface 125, and/or interface protector 126a-n of FIGS. 4-6 may include one or more elements, processes and/or devices in addition to, or instead of, those illustrated in FIGS. 4-6, and/or may include more than one of any or all of the illustrated elements, processes and devices.

Flowcharts representative of example machine readable instructions for implementing the example outlier filter 120, signal processing sub-system interface 125, and/or interface protector 126a-n of FIGS. 4-6 are shown in FIGS. 7-11. In this example, the machine readable instructions comprise a program for execution by a processor such as the processor 1312 shown in the example processor platform 1300 discussed below in connection with FIG. 13. The program may be embodied in software stored on a non-transitory computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 7-11, many other methods of implementing the example outlier filter 120, signal processing sub-system interface 125, and/or interface protector 126a-n of FIGS. 4-6 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 7-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 7:
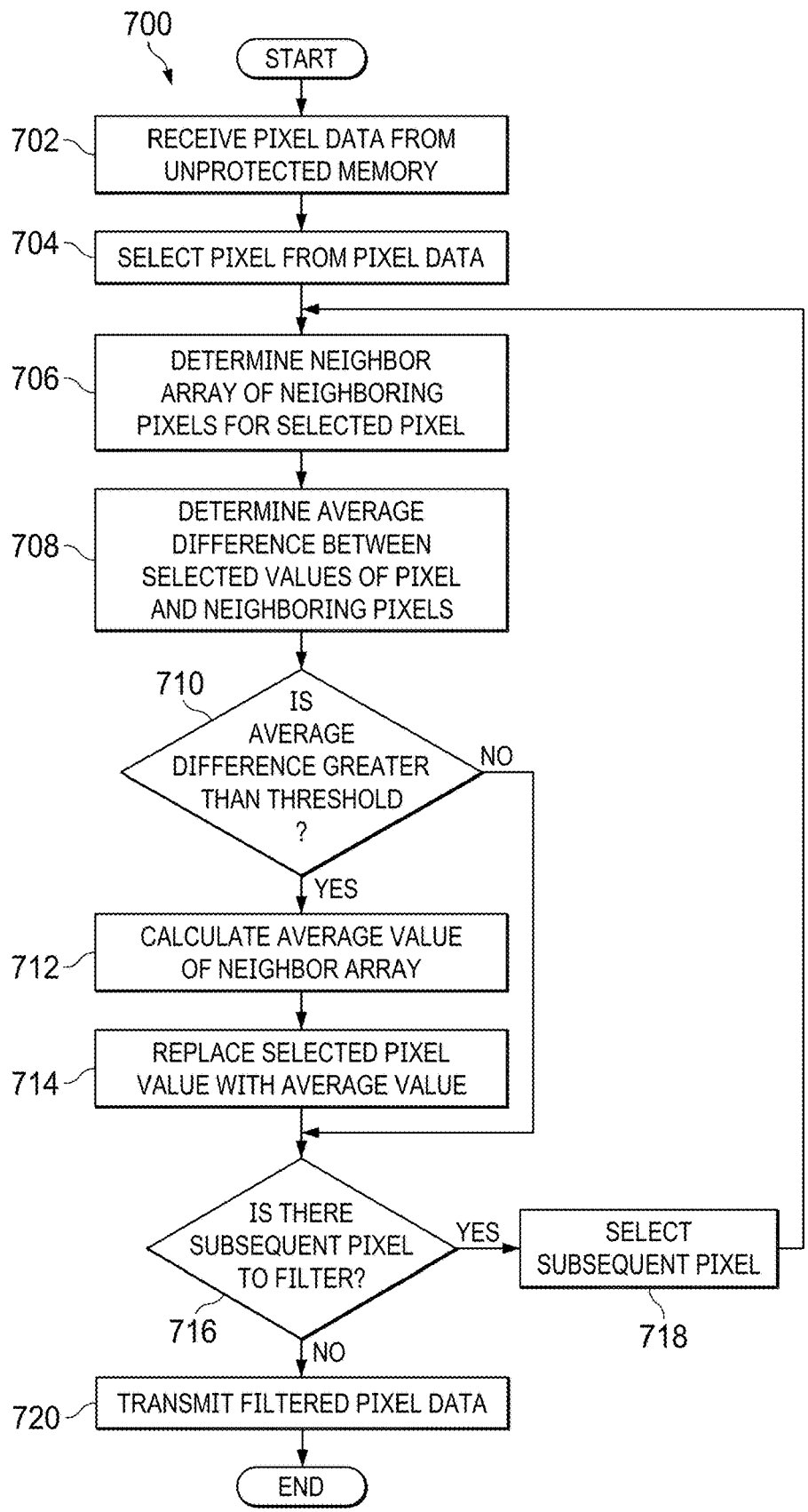
FIGS. 7-9 are flowcharts representative of machine readable instructions which may be executed to implement the example outlier filter of FIG. 4.

FIG. 7 is an example flowchart 700 representative of example machine readable instructions that may be executed by the example outlier filter 120 of FIG. 4 to filter outlier pixel values corresponding to an image. Although the instructions of FIG. 7 are described in conjunction with the example outlier filter 120 of FIGS. 1-4, the example instructions may be utilized by any type of outlier filter in any type of hardware accelerator.

At block 702, the example receiver 400 receives pixel data from the example unprotected memory 114a-n of FIGS. 1-4. The pixel data includes a location (e.g., within an array corresponding to a picture) and value (e.g., brightness and/or color) of the pixels. At bock 704, the example data processor 404 selects a pixel from the pixel data. When the example outlier filter 120 filters pixel data, the example outlier filter 120 may filter each individual pixel or may filter certain predefined pixels based on a location of the predefined pixel. Accordingly, the selected pixel may be a predefined pixel based on a predefined location and/or may be a first pixel of the pixel data (e.g., a pixel corresponding to the top, right corner of the image).

At block 706, the example neighbor array determiner 402 determines a neighbor array of neighboring pixels for the selected pixel. For example, if the pixel is the top-left corner pixel, the example neighbor array determiner 402 may determine a neighbor array based on the pixels that are next to (e.g., to the right of, below, and diagonal to) the selected pixel, thereby generating a 2×2 pixel array. In another example, if the pixel is not a corner or side pixel, the example neighbor array determiner 402 may determine a neighbor array based on the surrounding (e.g., to the right of, below, above, to the left of, and diagonal to) the selected pixel, thereby generating a 3×3 array where the selected pixel is the center of the array. Alternatively, the example neighbor array determiner 402 may determine a pixel array based on any dimensions.

At block 708, the example data processor 404 determines an average difference between the values of the selected pixel and the neighboring pixels of the neighbor array. For example, if the selected pixel has a value of 1, and the neighbor array pixels have values of 10, 9, 11, 8, 10, 6, 10, and 11, the average distance with respect to the predefined pixel is 8.4

$$\left(e.g., \frac{(10-1)+(9-1)+(11-1)+(8-1)+(10-1)+(6-1)+(10-1)+(11-1)}{8}\right).$$

At block 710, the example data processor 404 determines if the average difference is greater than a threshold (e.g., defined by a user and/or manufacturer). Using the above example, if the threshold corresponds to a value of 5, for example, the example data processor 404 determines that the average difference is greater than the threshold. In another example, if the threshold corresponds to a value of 5 and the average distance is 4.2, the example data processor 404 determines that the average distance is less than the threshold.

If the example data processor 404 determines that the average distance is not greater than the threshold (block 710: NO), the process continues to block 716. If the example data processor 404 determines that the average distance is greater than the threshold (block 710: YES), the example data adjuster 406 calculates the average value of the neighbor array (e.g., which or without the selected pixel) (block 712). At block 714, the example data adjuster 406 replaces value of the selected pixel with the average value. For example, if the average value of the neighbor array is 8, the example data adjuster 406 may replace the outlier value of the selected pixel with the value 8 (e.g., the average).

At block 716, the example data processor 404 determines if there is a subsequent pixel to filter. For example, if there are 100 predefined pixels to filter and only one has been filtered, the example outlier filter 120 will select a subsequent predefined pixel and continue to filter until all 100 predefined pixels have been filtered. If the example data processor 404 determines that there is a subsequent pixel to filter (block 716: YES), the example data processor 404 selects the subsequent pixel (block 718) and the process returns to block 706. If the example data processor 404 determines that there is a subsequent pixel to filter (block 716: NO), the example transmitter 408 outputs the filtered pixel data to the example local/on chip memory 122 (block 720).

Figure 8:
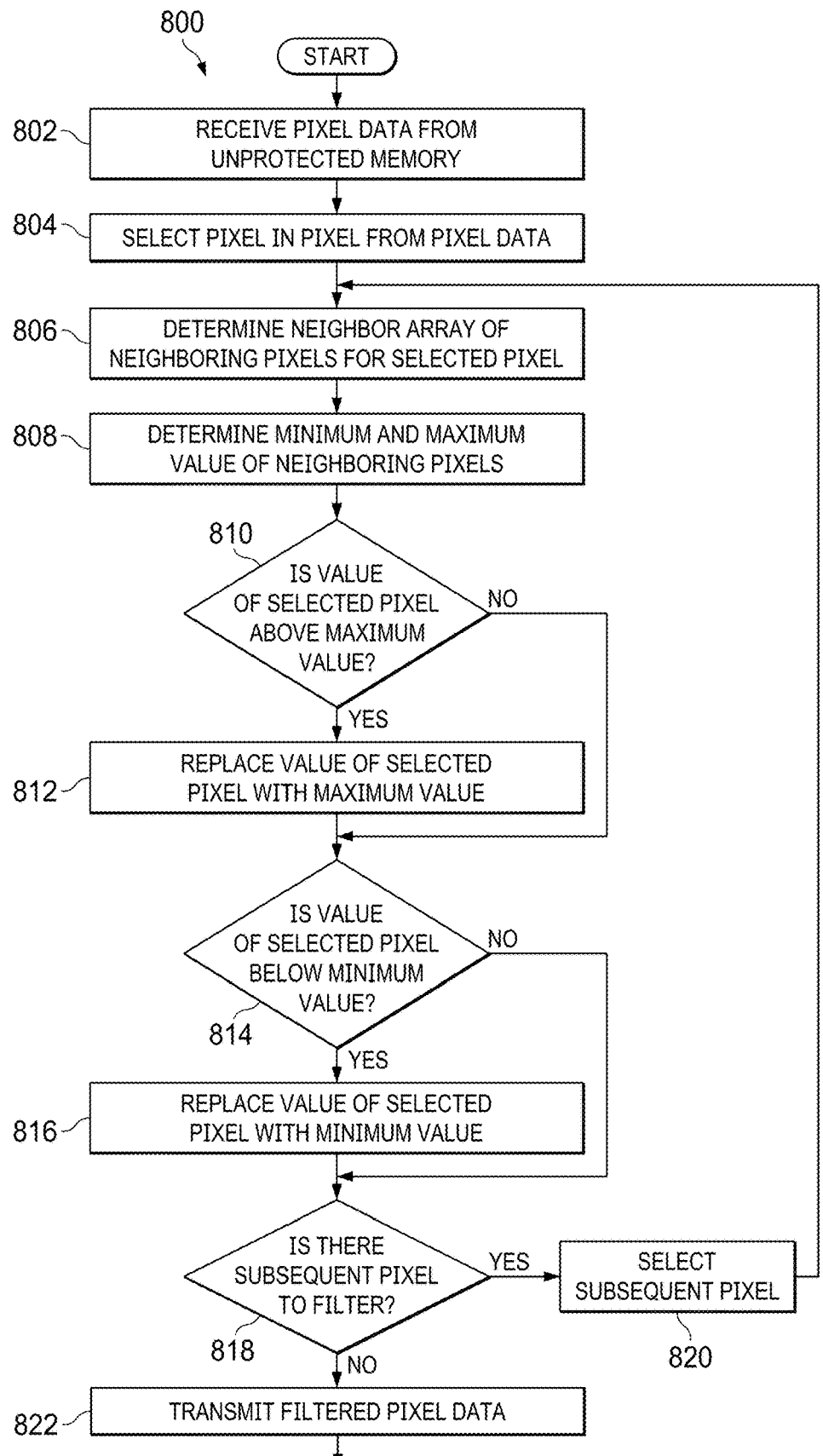

FIG. 8 is an example flowchart 800 representative of example machine readable instructions that may be executed by the example outlier filter 120 of FIG. 4 to filter outlier pixel values corresponding to an image. Although the instructions of FIG. 7 are described in conjunction with the example outlier filter 120 of FIGS. 1-4, the example instructions may be utilized by any type of outlier filter in any type of hardware accelerator.

At block 802, the example receiver 400 receives pixel data from the example unprotected memory 114a-n of FIGS. 1-4. The pixel data includes a location (e.g., within an array corresponding to a picture) and value (e.g., brightness and/or color) of the pixels. At bock 804, the example data processor 404 selects a pixel from the pixel data. When the example outlier filter 120 filters pixel data, the example outlier filter 120 may filter each individual pixel or may filter certain predefined pixels based on a location of the predefined pixel. Accordingly, the selected pixel may be a predefined pixel based on a predefined location and/or may be a first pixel of the pixel data (e.g., a pixel corresponding to the top, right corner of the image).

At block 806, the example neighbor array determiner 402 determines a neighbor array of neighboring pixels for the selected pixel. For example, if the pixel is the top-left corner pixel, the example neighbor array determiner 402 may determine a neighbor array based on the pixels that are next to (e.g., to the right of, below, and diagonal to) the selected pixel, thereby generating a 2×2 pixel array. In another example, if the pixel is not a corner or side pixel, the example neighbor array determiner 402 may determine a neighbor array based on the surrounding (e.g., to the right of, below, above, to the left of, and diagonal to) the selected pixel, thereby generating a 3×3 array where the selected pixel is the center of the array. Alternatively, the example neighbor array determiner 402 may determine a pixel array based on any dimensions.

At block 808, the example data processor 404 determines a minimum and a maximum value of the neighboring pixels in the neighbor array. For example, if the neighbor array pixels have values of 10, 9, 11, 8, 10, 6, 10, and 11, the example data processor 404 determines that the minimum pixel value is 6 and the maximum pixel value is 11. At block 810, the example data processor 404 determines if the value of the selected pixel is above the maximum value. Using the above example, if the selected pixel value is 14, for example, the example data processor 404 determines that the value of the selected pixel is above the maximum value of 11. In another example, if the selected pixel value is 10, for example, the example data processor 404 determines that the value of the selected pixel is not above the maximum value of 11.

If the example data processor 404 determines that the value of the selected pixel is not above the maximum pixel value (block 810: NO), the process continues to block 814. If the example data processor 404 determines that the value of the selected pixel is above the maximum value (block 810: YES), the example data adjuster 406 replaces the value of the selected pixel with the maximum value of the neighbor array (block 812). For example, if the selected pixel value is 14 and the maximum neighbor pixel value is 11, the example data adjuster 406 replaces the selected pixel value of 14 to the maximum value of 11.

At block 814, the example data processor 404 determines if the value of the selected pixel is below the minimum value. If the example data processor 404 determines that the value of the selected pixel is not below the minimum pixel value (block 814: NO), the process continues to block 818. If the example data processor 404 determines that the value of the selected pixel is below the minimum value (block 814: YES), the example data adjuster 406 replaces the value of the selected pixel with the minimum value of the neighbor array (block 816).

At block 818, the example data processor 404 determines if there is a subsequent pixel to filter. For example, if there are 100 predefined pixels to filter and only one has been filtered, the example outlier filter 120 will select a subsequent predefined pixel and continue to filter until all 100 predefined pixels have been filtered. If the example data processor 404 determines that there is a subsequent pixel to filter (block 818: YES), the example data processor 404 selects the subsequent pixel (block 820) and the process returns to block 806. If the example data processor 404 determines that there is a subsequent pixel to filter (block 820: NO), the example transmitter 408 outputs the filtered pixel data to the example local/on chip memory 122 (block 822).

Figure 9:
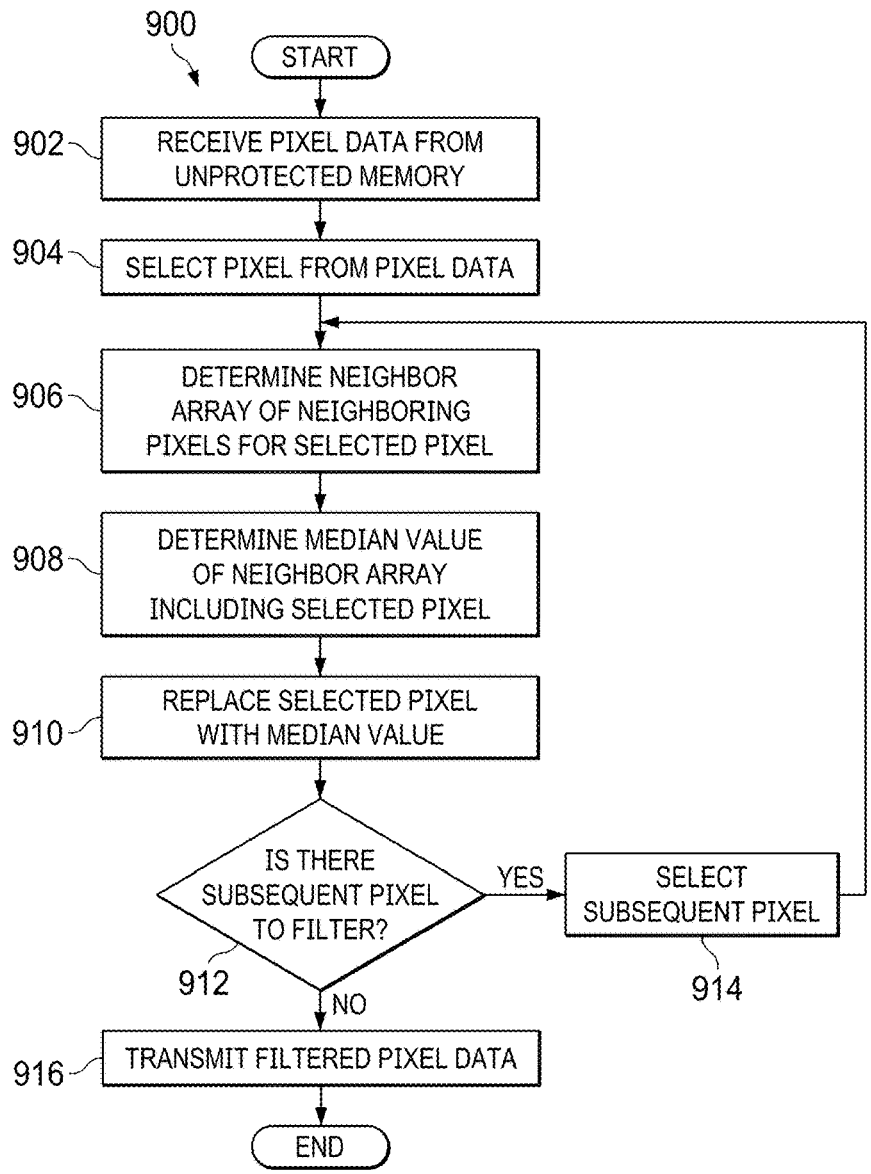

FIG. 9 is an example flowchart 900 representative of example machine readable instructions that may be executed by the example outlier filter 120 of FIG. 4 to filter outlier pixel values corresponding to an image. Although the instructions of FIG. 9 are described in conjunction with the example outlier filter 120 of FIGS. 1-4, the example instructions may be utilized by any type of outlier filter in any type of hardware accelerator.

At block 902, the example receiver 400 receives pixel data from the example unprotected memory 114a-n of FIGS. 1-4. The pixel data includes a location (e.g., within an array corresponding to a picture) and value (e.g., brightness and/or color) of the pixels. At bock 904, the example data processor 404 selects a pixel from the pixel data. When the example outlier filter 120 filters pixel data, the example outlier filter 120 may filter each individual pixel or may filter certain predefined pixels based on a location of the predefined pixel. Accordingly, the selected pixel may be a predefined pixel based on a predefined location and/or may be a first pixel of the pixel data (e.g., a pixel corresponding to the top, right corner of the image).

At block 906, the example neighbor array determiner 402 determines a neighbor array of neighboring pixels for the selected pixel. For example, if the pixel is the top-left corner pixel, the example neighbor array determiner 402 may determine a neighbor array based on the pixels that are next to (e.g., to the right of, below, and diagonal to) the selected pixel, thereby generating a 2×2 pixel array. In another example, if the pixel is not a corner or side pixel, the example neighbor array determiner 402 may determine a neighbor array based on the surrounding (e.g., to the right of, below, above, to the left of, and diagonal to) the selected pixel, thereby generating a 3×3 array where the selected pixel is the center of the array. Alternatively, the example neighbor array determiner 402 may determine a pixel array based on any dimensions.

At block 908, the example data processor 404 determines a median value of the neighbor array including the selected pixel. For example, if the selected pixel has a value of 1 and the neighbor array pixels have values of 10, 9, 11, 8, 10, 6, 10, and 11, the example data processor 404 determines the median value to be 10. At block 910, the example data adjuster 406 replaces the selected pixel with the median value. Using the above example, the example data processor 404 replaces the selected pixel value of 1 with the median pixel value of 10.

At block 912, the example data processor 404 determines if there is a subsequent pixel to filter. For example, if there are 100 predefined pixels to filter and only one has been filtered, the example outlier filter 120 will select a subsequent predefined pixel and continue to filter until all 100 predefined pixels have been filtered. If the example data processor 404 determines that there is a subsequent pixel to filter (block 912: YES), the example data processor 404 selects the subsequent pixel (block 914) and the process returns to block 906. If the example data processor 404 determines that there is a subsequent pixel to filter (block 912: NO), the example transmitter 408 outputs the filtered pixel data to the example local/on chip memory 122 (block 916).

Figure 10:
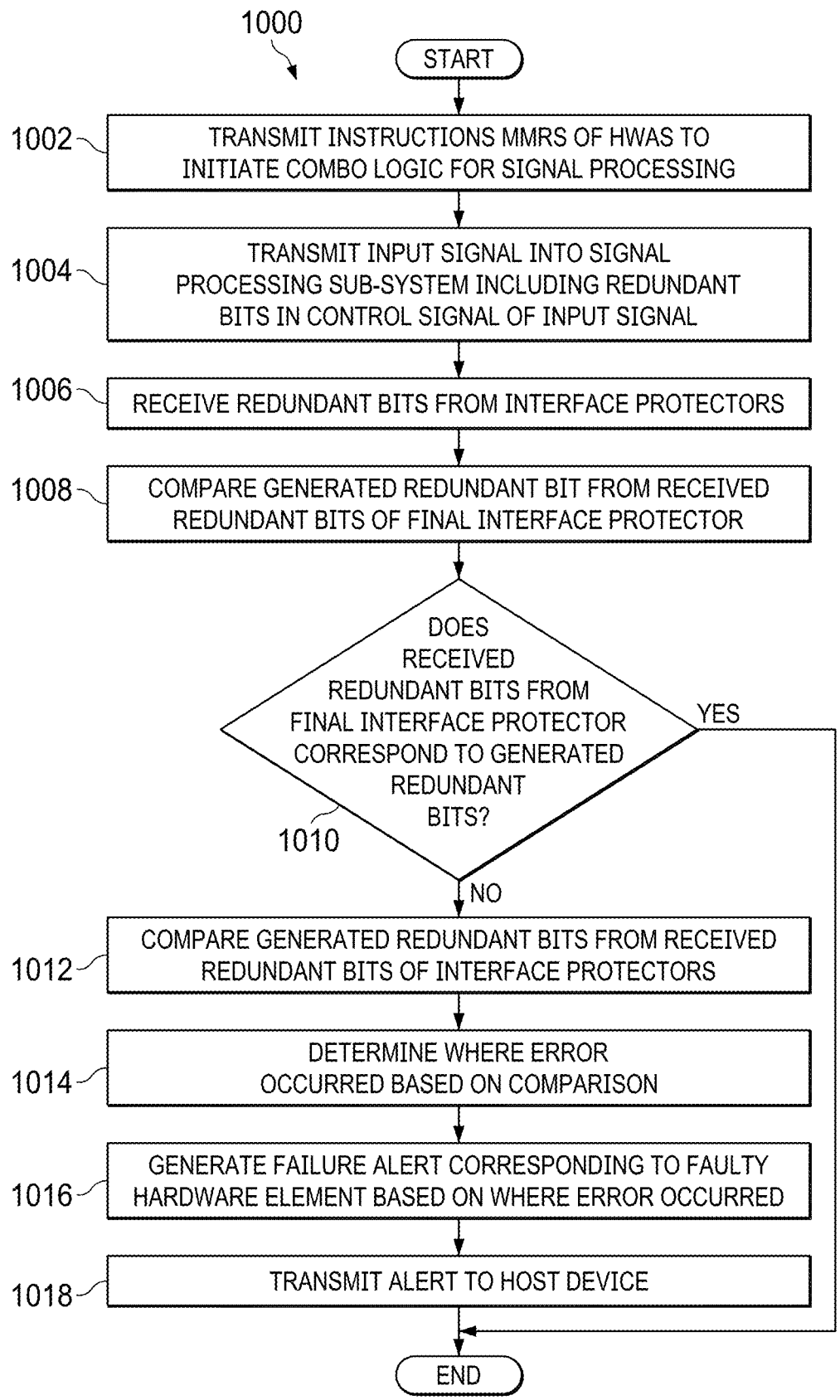
FIG. 10 is a flowchart representative of machine readable instructions which may be executed to implement the example signal processing sub-system interface of FIG. 5.

FIG. 10 is an example flowchart 1000 representative of example machine readable instructions that may be executed by the example signal processing sub-system interface 125 of FIG. 5 to generate an alert based on a hardware failure of the example signal processing sub-system 102, 200, 300 of FIGS. 1-3. Although the instructions of FIG. 10 are described in conjunction with the example signal processing sub-system interface 125 of FIGS. 1-3 and/or 5, the example instructions may be utilized by any type of signal processing sub-system interface within any type of host device.

At block 1002, the example transmitter 500 transmits instructions to the example MMRs 110a-n of the example HWAs 106a-(n−1), 118 to initiate the example combo logic 108a-n for a particular signal processing protocol. At block 1004, the example transmitter 500 transmits an input signal into the example signal processing sub-system 102, 200, 300 with redundant bits included in the control signal. For example, the host device 124 may include or communicate with an image capturing sensor. The sensor may capture raw image data that may require image processing to render. Accordingly, the example transmitter 500 may transmit the raw image data along with control data as an input signal to the example signal processing sub-system 102, 200, 300. Additionally, the example transmitter 500 generates and includes redundant bits in the control signal to identify hardware errors corresponding to the example signal processing sub-system 102. The example transmitter 500 may add the redundant bits using a parity check protocol, a cyclic redundancy check protocol, a checksum protocol, etc.

At block 1006, the example receiver 502 receives redundant bits from the example interface protectors 126a-n. For example, receiver 502 may receive the redundant bits directly from each of the interface protectors 126a-n via dedicated hardware data lines coupled between respective interface protectors 126a-n and the host device 124. As described above in conjunction with FIG. 6, the interface protectors 126a-n process the control signal to determine the embedded redundant bits and transmit the determined redundant bits back to the example signal processing sub-system interface 125. If the received redundant bits do not match the redundant bits generated by the example transmitter 500, a hardware error has occurred.

At block 1008, the example data comparator 504 compares the generated redundant bits (e.g., the redundant bits added to the control signal by the transmitter 500) to the receive redundant bits from the final example interface protector 126n (e.g., corresponding to the signal processed and filtered output). If the generated redundant bits are the same as the received redundant bits, then no error has occurred. However, if the generated redundant bits are different from the received redundant bits, then an unintentional change of data occurred corresponding to a hardware error of the example HWAs 106a-(n−1), 118.

At block 1010, the example data comparator 504 determines if the received redundant bits from the final example interface protector 126n correspond to the generated redundant bits. If the example data comparator 504 determines that the received redundant bits from the final example interface protector 126n correspond to the generated redundant bits (block 1010: YES), the process ends. If the example data comparator 504 determines that the received redundant bits from the final example interface protector 126n do not correspond to the generated redundant bits (block 1010: NO), the example data comparator 504 compares the generated redundancy bits from the received redundant bits of the example interface protectors 126a-n (block 1012).

At block 1014, the example data comparator 504 determines where the error occurred based on the comparison. For example, the data comparator 504 may determine from which interface protector 126a-n did the received redundant bits begin to differ from the generated redundant bits (e.g., where the first discrepancy occurred). As described above, because each of the interface protectors 126a-n corresponds to a difference hardware element of the example signal processing sub-system 102, 200, 300, the example data comparator 504 can identify which hardware element caused the error by determining which interface protector 126a-n corresponds to the first discrepancy. At block 1016, the example alerter 506 generates a failure alert corresponding to the faulty hardware element (e.g., HWA 106a-(n−1), 118 and/or local/con-chip memory 122) based on where the error occurred. At block 1018, the example transmitter 500 transmits the alert to the host device 124 for further processing and/or decision making.

Figure 11:
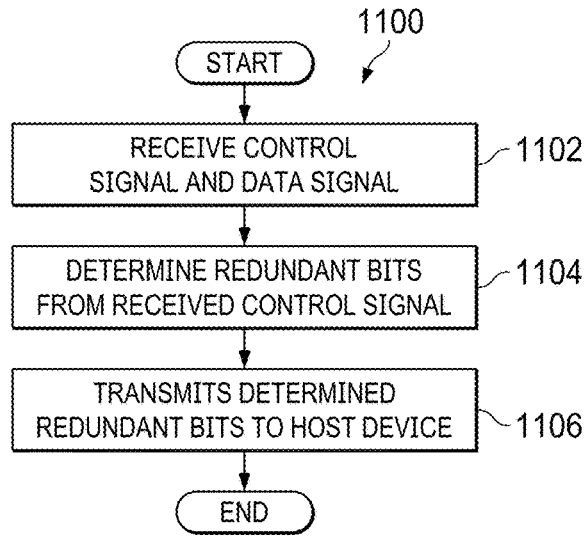
FIG. 11 is a flowchart representative of machine readable instructions which may be executed to implement the example interface protector of FIG. 6.

FIG. 11 is an example flowchart 1100 representative of example machine readable instructions that may be executed by the example interface protector 126a of FIG. 6 to determine redundant bits from a control signal. Although the instructions of FIG. 11 are described in conjunction with the example interface protector 126a of FIGS. 1-3 and/or 6, the example instructions may be utilized by any type of interface protector (e.g., the example interface protectors 126a-n, or any other interface protector) within any type of signal processing sub-system.

At block 1102, the example redundant bit determiner 600 receives a control signal and data signal corresponding to an input signal transmitted by the example host device 124. As described above, the data signal includes individual data values, while the control signal includes address information, protocol information etc. Additionally, the control signal includes redundant bits that were added to the control signal. At block 1104, the example redundant bit determiner 600 determines the redundant bits from the received control signal. The example redundant bit determiner 600 may determine the redundant bits using a parity check protocol, a cyclic redundancy check protocol, a checksum protocol, etc. At block 1106, the example redundant bit determiner 600 transmits the determined redundant bits to the example host device 124.

Figure 12A:
FIGS. 12A-C illustrate a comparison of example image that is not protected, that is protected and not filtered, and that is protected and filtered.
Figure 12B:
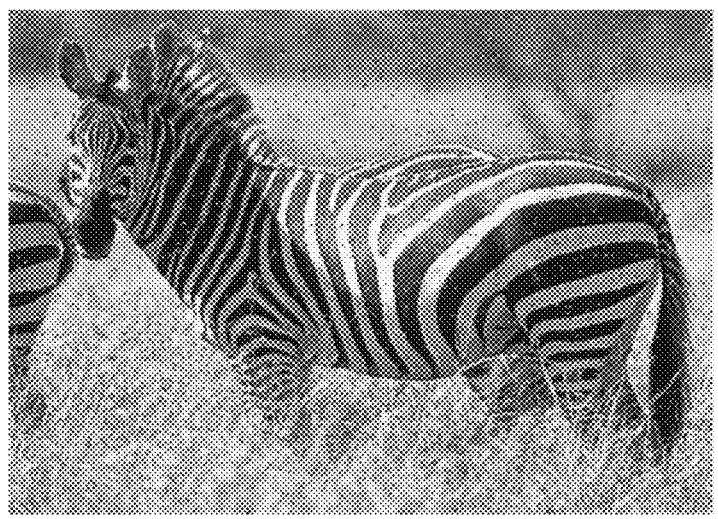
Figure 12C:
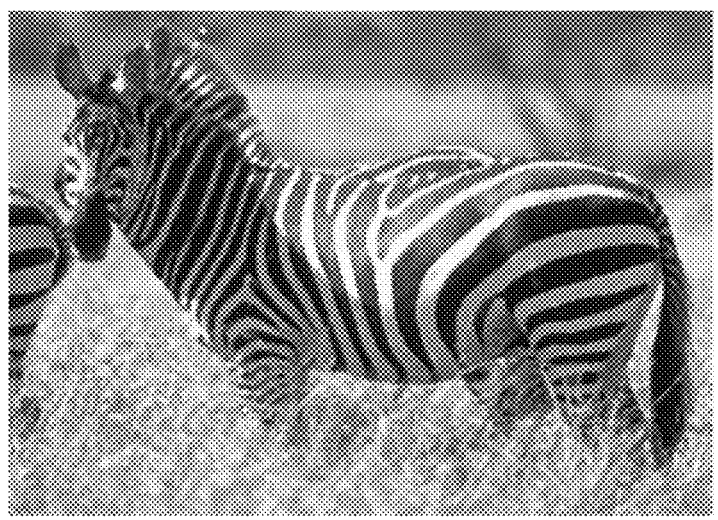

FIGS. 12A-C illustrate three example images that have been processed by a signal processing sub-system. The first example image 1200 corresponds to a critical error that has occurred in a signal processing sub-system that does not include the example protected memory 116a-n in the example HWAs 106a-(n−1), 108a-n of FIGS. 1-3. The second example image 1202 corresponds to an imaged that has been processed with the example unprotected memory 114a-n and the example protected memory 116a-n in the example HWAs 106a-(n−1), 108a-n prior to being filtered by a HWA that includes the example outlier filter 120 of FIGS. 1-3. The third example image 1204 corresponds to an imaged that has been processed with the example unprotected memory 114a-n and the example protected memory 116a-n in the example HWAs 106a-(n−1), 108a-n and filtered by the example outlier filter 120 of FIGS. 1-3.

The first example image 1200 of FIG. 12A corresponds to rendered image data that has been processed by a signal processing sub-system that does not include the example protected memory 116a-n, where a critical hardware error occurred. As shown in the first example image 1200, the critical hardware error corresponds to the entire image being blacked-out, or otherwise unusable.

The second example image 1202 of FIG. 12B corresponds to rendered image data that has been processed by the example signal processing sub-system 102, 200, 300, prior to the example outlier filter 120 has filtered the image data. As shown in the second example image 1202, including the example protected memory 116a-n for storage of critical data, the second example image 1202 is useable for further processing, even when an error occurs, because the critical data is protected. However, because the raw pixel data is unprotected (e.g., stored in the example unprotected memory 114a-n), individual pixel values may be corrupted, thereby causing pixel inaccuracies in the second example image 1202.

The third example image 1204 of FIG. 12C corresponds to the rendered image data that has been processed and filtered by the example signal processing sub-system 102, 200, 300. As shown in the third example image 1204, the corrupted pixel values of the second example image 1202 are reduced/eliminated through the filtering process. Accordingly, the third example image 1204 is the highest quality image, thereby providing optimal image data to the example host device 124 for further processing.

Figure 13:
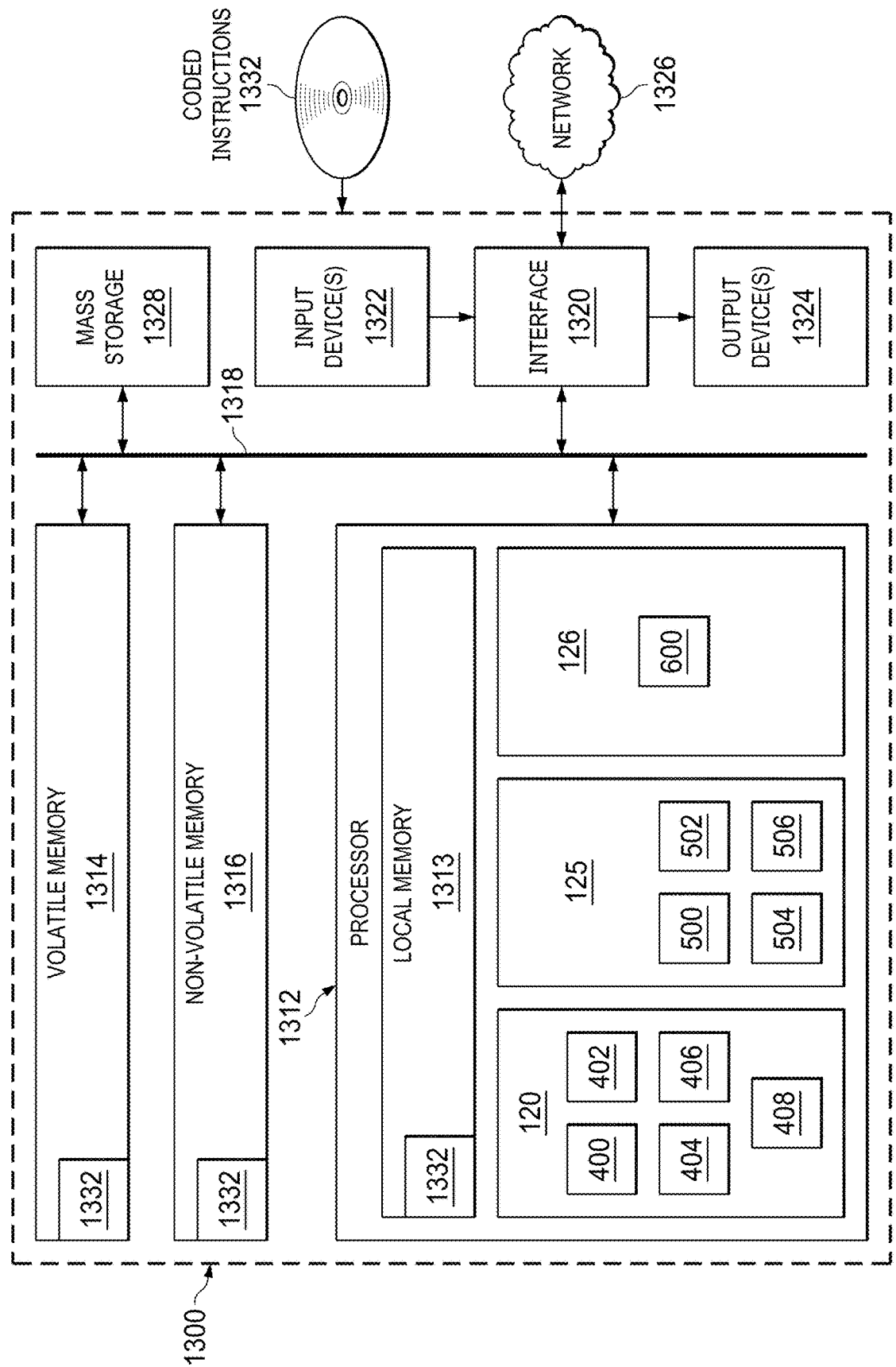
FIG. 13 is a block diagram of an example processing platform structured to execute the instructions of FIG. 7-11 to implement the example outlier filter, the example signal processing sub-system interface, and/or the example interface protector of FIGS. 4-6.

FIG. 13 is a block diagram of an example processor platform 1300 capable of executing the instructions of FIGS. 7-11 to implement the example outlier filter 120, signal processing sub-system interface 125, and/or the example interface protector of FIG. 4-6. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a vehicle computing system, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The hardware processor may be a semiconductor based (e.g., silicon based) device. In this example, the processor 1312 implements the example receiver 400, the example neighbor array determiner 402, the example data processor 404, the example data adjuster 406, the example transmitter 408, the example transmitter 500, the example receiver 502, the example data comparator 504, the alerter 506, and/or the example redundant bit determiner 600 of FIGS. 4-6.

The processor 1312 of the illustrated example includes a local memory 1313 (e.g., a cache). The example local memory 1313 may implement the example unprotected memory 114a-n, and the example protected memory 116a-n of FIGS. 1-3. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller. The example volatile memory 1314 and/or the example non-volatile memory 1316 may be used to implement the example local/on-chip memory 122 of FIGS. 1-3.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 7-11 may be stored in the mass storage device 1328, in the volatile memory 1314, in the non-volatile memory 1316, and/or on a removable tangible computer readable storage medium such as a CD or DVD.

From the foregoing, it will be appreciated that example methods, apparatus and articles of manufacture have been disclosed that provide an efficient safety mechanism for signal processing hardware. Conventional memory protection techniques include providing memory protection for all data being processed, which increase cost and silicon area (e.g., integrated circuit space). Examples disclosed herein reduce the cost and silicon area corresponding to such conventional safety protocols by providing protected memory and unprotected memory for the hardware accelerators and allocating some data to be stored in the protected memory and other data to be stored in the unprotected memory. Examples disclosed herein provide 75% more silicon area savings then conventional techniques without reducing overall signal processing output.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A hardware accelerator comprising:
   an unprotected memory configured to store a first set of data from an input signal without memory failure protection, wherein failure of any of the first set of data corresponds to corruption of an output data set that is less than or equal to a threshold amount of corruption, and wherein the first set of data includes data from a group consisting of: pixel data, a motion vector, and a stereo disparity;
   a protected memory configured to store a second set of data from the input signal with memory failure protection, wherein failure of any of the second set of data corresponds to corruption of the output data set that is more than the threshold amount of corruption, and wherein the second set of data includes data from a group consisting of: a lookup table, protocol information, a filter coefficient, and a statistical value;
   logic configured to process the input signal; and
   an output interface to output the processed input signal.

2. The hardware accelerator of claim 1, further including a combinatory logic circuit to process the input signal.

3. The hardware accelerator of claim 1, wherein the memory failure protection includes at least one of parity protection or error correcting code protection.

4. The hardware accelerator of claim 1, wherein the threshold amount of corruption is determined based on a level of viewability of the output data set when the output data is displayed.

5. The hardware accelerator of claim 1, further including a host device to transmit the input signal, the output interface is to transmit the processed input signal to the host device.

6. The hardware accelerator of claim 5, further including an interface protector to determine redundant bits corresponding to control data of the processed input signal, the output interface to transmit the redundant bits to the host device, the redundant bits generated by the host device.

7. The hardware accelerator of claim 6, wherein the redundant bits are first redundant bits, the input signal includes second redundant bits in a control signal, and the host device is to:
   obtain the second redundant bits from the interface protector;
   compare the first redundant bits to the second redundant bits; and
   when the first redundant bits do not correspond to the second redundant bits:
   determine where an error occurred; and
   generate a failure alert corresponding to a faulty hardware element based on where the error occurred.

8. The hardware accelerator of claim 2, wherein the hardware accelerator is a first hardware accelerator, further including a second hardware accelerator to obtain an output of the first hardware accelerator, the second hardware accelerator including an outlier filter to filter the first set of data to remove error.

9. The hardware accelerator of claim 8, wherein the error corresponds to at least one of (A) a hardware fault or (B) a bit error in one or more transistors or a logic circuit.

10. The hardware accelerator of claim 8, wherein the second hardware accelerator combines an outlier filter operation with a pre-existing filter operation.

11. The hardware accelerator of claim 8, wherein the combinatory logic circuit is to process the input signal prior to filtering the first set of data.

12. The hardware accelerator of claim 8, wherein the second hardware accelerator replaces a third hardware accelerator dedicated to filtering.

13. The hardware accelerator of claim 8, wherein the first set of data includes the pixel data, the outlier filter to filter a pixel corresponding to the pixel data by:
   determining a neighbor array of pixels neighboring the pixel;
   determining an average difference between values of the neighboring pixels and a value of the pixel; and
   when the average difference is above a threshold, replacing the value of the pixel with an average value of the neighbor array.

14. A method comprising:
   receiving an input signal that includes:
   a first set of data that includes at least one of: pixel data, a motion vector, or a stereo disparity; and
   a second set of data that includes at least one of: a lookup table, protocol information, a filter coefficient, or a statistical value;
   storing the first set of data of the input signal into non-protected memory, the non-protected memory lacking memory failure protection, wherein failure of any of the first set of data corresponds to corruption of an output data set that is less than or equal to a threshold amount of corruption;

storing the second set of data of the input signal into memory including memory failure protection, wherein failure of any of the second set of data corresponds to corruption of the output data set that is more than the threshold amount of corruption;

processing the input signal stored in the protected and non-protected storage; and transmitting, as the output data set, the processed input signal.

15. The method of claim 14, wherein the memory failure protection includes at least one of parity protection or error correcting code protection.

16. The method of claim 14, wherein the threshold amount of corruption is determined based on a level of viewability of the output data set when the output data is displayed.

17. The method of claim 14, further including transmitting the processed input signal to a host device, the input signal being transmitted by the host device.

18. The method of claim 17, further including determining redundant bits corresponding to control data of the processed input signal and transmitting the redundant bits to the host device.

19. The method of claim 18, wherein the redundant bits are first redundant bits, the input signal includes second redundant bits in a control signal, and the method further includes:

obtaining the second redundant bits;

comparing the first redundant bits to the second redundant bits; and when the first redundant bits do not correspond to the second redundant bits:

determining where an error occurred; and generating a failure alert corresponding to a faulty hardware element based on where the error occurred.

20. The method of claim 14, further including filtering the first set of data of the processed signal to remove an error.

21. The method of claim 20, wherein the error corresponds to at least one of (A) a hardware fault or (B) a bit error in one or more transistors or a logic circuit.

22. The method of claim 20, wherein the filtering includes an outlier filter operation with a pre-existing filter operation.

23. The method of claim 20, further including processing the processed signal prior to filtering the first set of data.

24. The method of claim 20, wherein the first set of data includes the pixel data, and further including filtering a pixel corresponding to the pixel data by:

determining a neighbor array of pixels neighboring the pixel;

determining an average difference between values of the neighboring pixels and a value of the pixel; and when the average difference is above a threshold, replacing the value of the pixel with an average value of the neighbor array.

25. A non-transitory computer readable medium comprising instructions which, when executed, cause a machine to at least:

receive an input signal that includes:

a first set of data that includes at least one of: pixel data, a motion vector, or a stereo disparity; and a second set of data that includes at least one of: a lookup table, protocol information, a filter coefficient, or a statistical value;

store the first set of data corresponding to the input signal into memory not including memory failure protection, wherein failure of any of the first set of data corresponds to corruption of an output data set that is less than or equal to a threshold amount of corruption;

store the second set of data corresponding to the input signal into memory failure protected memory, wherein failure of any of the second set of data corresponds to corruption of the output data set that is more than the threshold amount of corruption;

process the input signal stored in the protected and non-protected storage; and transmit, as the output data set, the processed input signal.

26. The computer readable medium of claim 25, wherein the threshold amount of corruption is determined based on a level of viewability of the output data set when the output data is displayed.

27. The computer readable medium of claim 25, wherein the instructions cause the machine to transmit the processed input signal to a host device, the input signal transmitted by the host device.

28. The computer readable medium of claim 27, wherein the instructions cause the machine to determine redundant bits corresponding to control data of the processed input signal and transmit the redundant bits to the host device.

29. The computer readable medium of claim 28, wherein the redundant bits are first redundant bits, the input signal includes second redundant bits in a control signal, and the instructions cause the machine to:

obtain the second redundant bits;

compare the first redundant bits to the second redundant bits; and when the first redundant bits do not correspond to the second redundant bits:

determine where an error occurred; and generate a failure alert corresponding to a faulty hardware element based on where the error occurred.

* * * * *